United States Patent [19]
Wulker et al.

[11] Patent Number: 5,942,059
[45] Date of Patent: Aug. 24, 1999

[54] DEVICE AND METHOD FOR COATING A ROTATING BODY WITH ELASTOMERIC WEAR LAYER

[75] Inventors: Jan Wulker, Varberg; Willie Reppel, Falkenberg, both of Sweden

[73] Assignee: Decapo Ltd, Kent, United Kingdom

[21] Appl. No.: 08/702,631

[22] PCT Filed: Feb. 22, 1995

[86] PCT No.: PCT/SE95/00180

§ 371 Date: Sep. 3, 1996

§ 102(e) Date: Sep. 3, 1996

[87] PCT Pub. No.: WO95/23686

PCT Pub. Date: Sep. 8, 1995

[30] Foreign Application Priority Data

Mar. 3, 1994 [SE] Sweden .................................. 9400725

[51] Int. Cl.⁶ .................................................. B29D 30/60
[52] U.S. Cl. ........................... 156/64; 118/670; 118/697; 118/712; 156/96; 156/117; 156/130; 156/360; 156/361; 156/397; 425/140
[58] Field of Search .................................... 156/130, 117, 156/96, 397, 405.1, 361, 360, 64, 172, 244.11; 425/17, 140, 141; 118/670, 669, 697, 712

[56] References Cited

U.S. PATENT DOCUMENTS

| Re. 28,043 | 6/1974 | Hineline | 156/130 |
|---|---|---|---|
| 3,497,408 | 2/1970 | Hineline | 156/130 |
| 3,901,756 | 8/1975 | Wireman et al. | 156/361 |
| 3,975,126 | 8/1976 | Wireman et al. | 425/141 |
| 4,062,716 | 12/1977 | Galantine et al. | 156/361 |
| 4,155,789 | 5/1979 | Wireman et al. | 156/130 |
| 4,240,863 | 12/1980 | Vinton | 156/361 |

FOREIGN PATENT DOCUMENTS

| 61-37422 | 2/1986 | Japan | 156/96 |
|---|---|---|---|
| 368081 | 1/1973 | U.S.S.R. | 156/130 |
| 856849 | 8/1981 | U.S.S.R. | 156/397 |
| 1031753 | 7/1983 | U.S.S.R. | 156/397 |

*Primary Examiner*—Geoffrey L. Knable
*Attorney, Agent, or Firm*—Shapiro and Shapiro

[57] ABSTRACT

A control apparatus and method for a coating device utilize a measurement system to determine whether a body supplied to the coating device is acceptable for coating and/or to establish template data in preparation for a coating operation. The measurement system also obtains measurements of a body while the body is being coated, and these measurements are used to control the coating operation.

18 Claims, 3 Drawing Sheets

DEVICE AND METHOD FOR COATING A ROTATING BODY WITH ELASTOMERIC WEAR LAYER

BACKGROUND OF THE INVENTION

1. Field of the Invention

This invention relates to a control system for controlling a device which is adapted to coat a body with a wear layer and which comprises a frame on which the body can be rotatably arranged, a system for producing a mass of elastomeric material, a system for discharging the mass of elastomeric material and forming it into a strand, a system for applying the strand on the body so as to form the wear layer, and a system for automatic feedback control of the coating of said body.

Coating a body, such as a tire carcass or a roller in a papermaking machine, with elastomeric material, such as rubber, in the form of strands (which are subsequently vulcanized), is not without its problems. Hitherto, it has not been possible to solve these problems in a satisfactory fashion. The present application concerns a technique for coating a hotly with rubber that aims at providing the rubber layer or tread with a certain profile, i.e. a certain outline and/or thickness. The profile is dependent on the dimensions of the rubber strand applied and on the closeness of the turns of rubber strand, which generally is identical with the degree of overlapping between one turn and the immediately preceding turn.

2. Related Background Art

There exist today control systems and methods aiming at achieving a certain, desired profile. In a prior-art method, the system controlling the coating machine is supplied with predetermined values of the closeness of the turns, and the machine i.. then operated according to these values with the aid of the control system, a predetermined rubber thickness being approximately achieved at each point on the body.

In another prior-art method, a template for the final profile is arranged behind the body, and an operator controls, via the control system, the coating with rubber while watching the body and the template in order to ensure that a profile corresponding to the template is obtained.

There are many problems associated with the above prior-art methods, and these problems are due to the control system itself as well as the way this is used. These problems are long standing, and the best efforts to find a solution have resulted in the control systems described above.

Thus, the scrap percentage is embarrassingly high, and the quality of the end product leaves much to be desired, especially in certain applications, such as retreading and other sorts of recapping where the body is not new but merely reconditioned in view of the coating process.

Additionally, in the prior art, the rubber consumption is far from optimal. In mass production of the type commonly used in this field, each saved gram of rubber is important, at least from the economic point of view, and there is thus a great demand for a technique enabling a minimization of the rubber consumption.

These problems are primarily due to very approximate and inaccurate control of the rubber coating itself, the variations in a body or the variations between bodies of the same type being not taken into consideration, as in the first-mentioned prior-art technique, and/or the errors being overcompensated, as in both prior-art techniques described above. Consequently, an uneven body may result in an uneven rubber layer. Excessive amounts of rubber are applied to ensure that an aimed-at minimum thickness is achieved. Furthermore, the method using visual inspection for comparing the rubber layer with a template also involves an excessive rubber consumption, owing to the operators inability to assess the results correctly, for which reason the rubber layer will be thicker than is strictly necessary to ensure that the template is covered.

Furthermore, there does not exist any efficient and cost-effective method for checking the quality of the body, which may vary within wide limits, primarily in certain applications, such as retreading. In combination with the above-mentioned control problems, this means that an unintentional irregularity of the body, such as an oval or crooked shape, affects also the rubber layer, resulting in an end product of irregular shape, which too often has to be scrapped. This leads to excessive production costs, a waste of raw material and energy, as well as complaints from customers, and may even result in a dangerous end product which, in the worse case, may pass the final inspection. In the second-mentioned prior-art technique, it is true that some irregularities may be compensated for, but also here are some irregularities, such as an oval shape as well as local irregularities not found in a whole turn, transferred to the rubber layer. When a portion of the body has a smaller or larger diameter than is assumed in the process, there is, furthermore, a risk that the rubber layer applied, which gives a profile approximately agreeing with the template, will be thicker or thinner in this portion than is deemed suitable.

SUMMARY OF THE INVENTION

One object of the invention is to provide a control system and a method for coating a body with a wear layer, for instance a rubber tread, resulting in a much-improved end product.

Another object of the invention is to provide a control system and a method for coating a body with a wear layer, resulting in an optimum process with regard to material consumption.

According to the invention, these objects are achieved by a control system and a method, which are of the type mentioned above in the Field of the Invention have the distinctive features recited appended claims.

The control system and the method according to the invention enable much more reliable control of the coating of the body. The human factor in the form of the operator supervising the resulting profile has been eliminated and replaced with mechanical feedback recording the results of the coating as this proceeds and returning this information, such that the control parameters can be adjusted if need be. Such automatic feedback results in high accuracy in the coating process and reduces the material consumption.

A special embodiment of the invention has the additional features of using measurement data to control the coating process in accordance with a template.

This embodiment is advantageous in that the measurements and the computer in the feedback branch may be used for controlling the coating, as well as for rapidly checking the quality of the body before the wear layer is applied. As a result, a larger number of irregular bodies can be sorted out than in the prior art, which considerably reduces scrapping upon the final inspection and further enhances the quality of the end product.

BRIEF DESCRIPTION OF THE DRAWINGS

The invention will be described below with reference to the accompanying drawings, in which FIG. 1 schematically illustrates a machine, which includes part of a control system according to the invention, for coating a body with a wear layer.

DETAILED DESCRIPTION OF THE PREFERRED EMBODIMENTS

Figure 1:
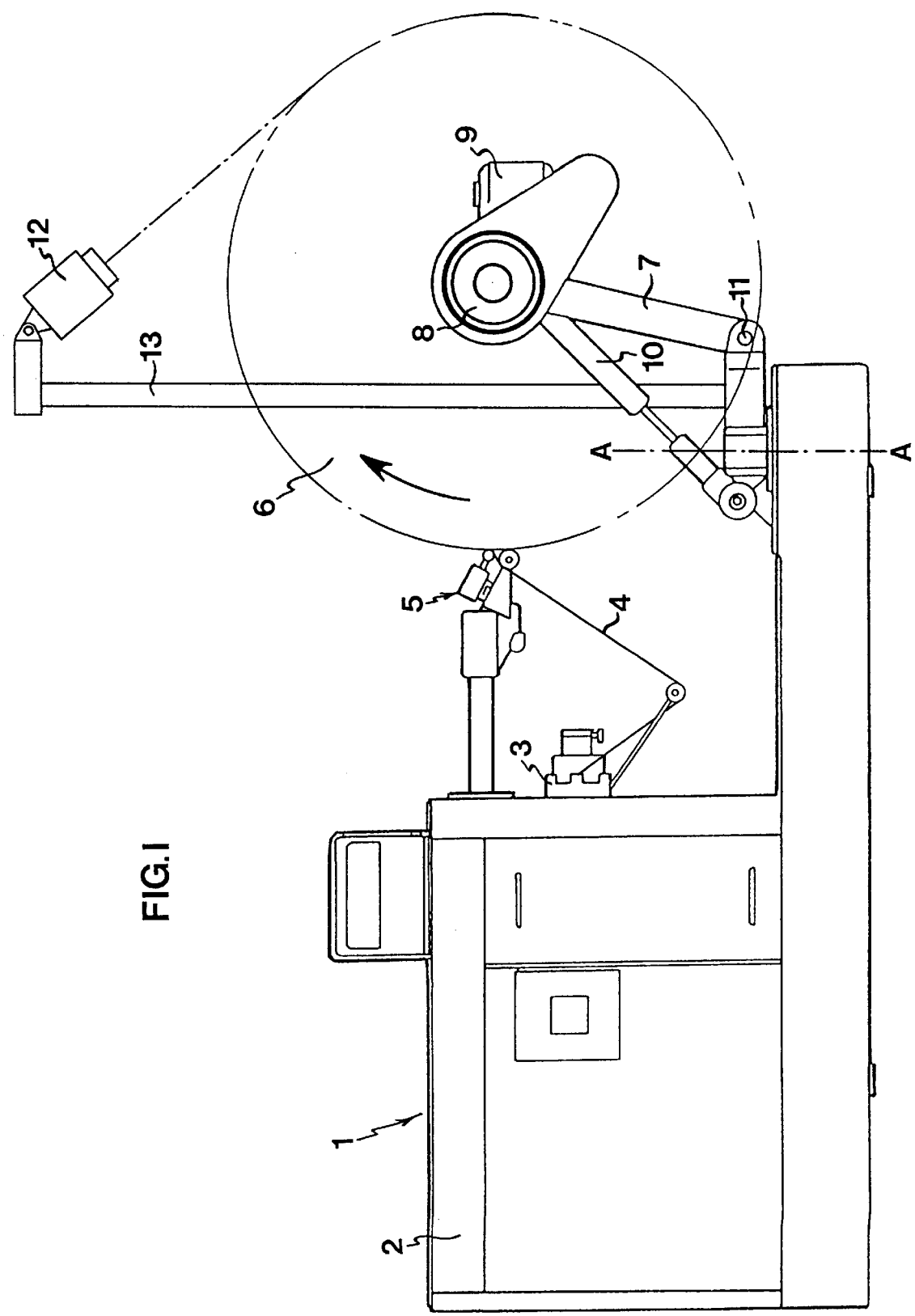

In the drawings, the control system according to the invention is applied to a machine for retreading tires. This is but an example of a possible application of the control system according to the invention. This embodiment, as well as a method for implementing the invention, will now be described in more detail in order to illustrate the invention.

FIG. 1 schematically illustrates converted components including a machine 1 for retreading tires. This machine 1 comprises a unit 2, which is adapted to prepare rubber mass and which includes an extruder. An assembly comprising rollers 3 discharges the rubber moss and forms it into a strand 4 of rectangular cross-section. A coating unit 5 applies the rubber strand to a carcass 6, whose periphery is indicated by a dash-dot line. The carcass 6 is rotatably arranged on a frame 7, more specifically on a hub 8 forming part of the frame 7. The body 6 is rotated with the aid of a motor 9. Also, the frame 7 is rotatably connected to the remainder of the machine 1. The axis of rotation is designated A—A and is referred to as the azimuth axis. When rotating about this axis A—A, the frame 7 obtains a certain azimuth angle in relation to its initial position. The inclination of the frame 7 may be adapted to different body diameters with the aid of a piston and cylinder unit 10, which pivots the frame 7 about a shaft 11.

However, FIG. 1 also shows components that are characteristic of the control system according to the invention, namely a detector 12, here in the form of a camera, and a camera stand 13 which is connected to the frame 7 and on which the camera is displaceably arranged.

Figure 2:
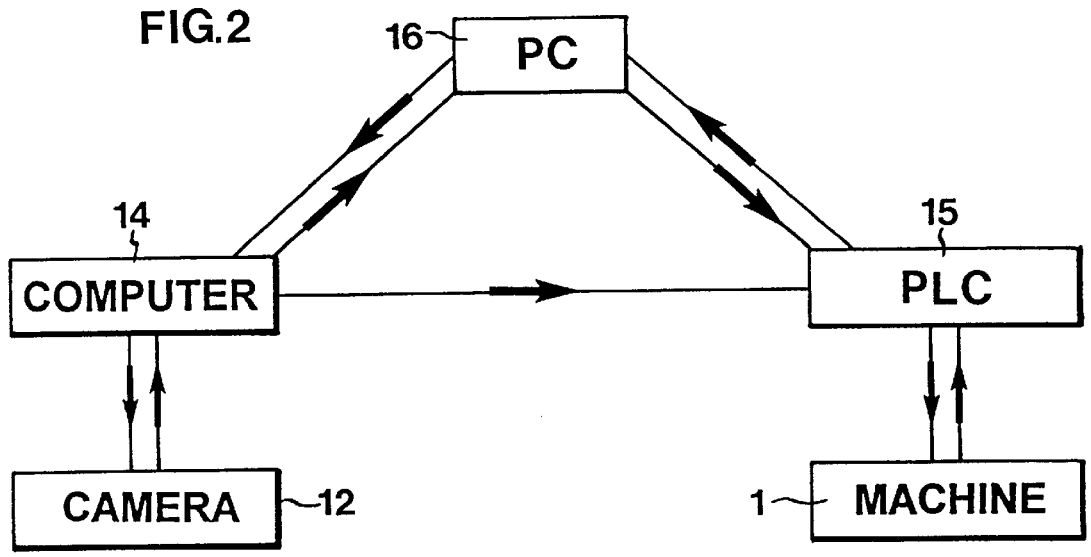
FIG. 2 is a block diagram showing the main components of the control system according to the invention.

FIG. 2 is a block diagram illustrating the main components of the control system according to the invention. These components may be divided into three groups, namely the camera 12 with an associated computer 14; a control unit 15 and the machine 1; and a personal computer 16.

The control unit 15, which for instance may include a PLC system, is connected directly to the machine 1 and controls the coating process. The operation of the control unit 15 will be described in more detail below.

The computer 14 receives picture information about the profile of the rubber tread from the camera 12, as well as information about the profile currently selected and the measurement tolerances of the selected profile from the personal computer 16. On the basis of the information received from the personal computer 16 and the camera 12, the computer 14 decides if the control need be amended in any way and, if necessary, transmits amendment signals to the control unit 15. The operation of the computer 14 will be described in more detail below.

The personal computer 16 is connected to the control unit 15 and the computer 14. By means of the personal computer 16, the operator communicates with the remainder of the system and, inter alia, selects a suitable program according to the type of body 6 at issue. Furthermore, the operator may, for instance, input Information on the tire dimensions, the tread design and the thickness of the rubber tread. The operator further obtains various sorts of status information via the personal computer 16, with the aid of which he runs the process. The operation of the personal computer 16 will also be described in more detail below.

Furthermore, there are, of course, provided cabling for signal transmission, transducers, as well as motors actuated by the control unit for controlling parts of the process, such as the speed of rotation of the body and the azimuth angle of the frame. Some of these components are shown in FIGS. 3 and 4, but others have been left out for reasons of clarity.

Figure 3:
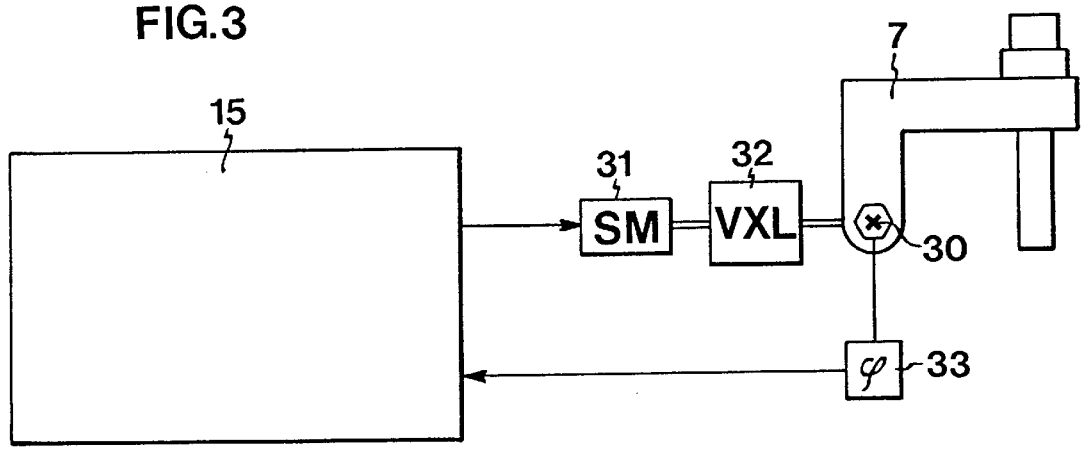
FIG. 3 schematically illustrates the control according to the invention of an azimuth angle.

FIG. 3 schematically illustrates part of the control performed by the control unit 15, namely the control of the azimuth angle and thus of the rotation of the body 6. The frame 7 is schematically shown from below, the azimuth axis (A—A in FIG. 1), which is perpendicular to the plane of the drawing, being indicated by an x designated 30. The control unit 15 controls a step motor (SM) 31. The step motor 31 causes the frame 7 to rotate via a gear (VXL) 32. The rotational movement is recorded as an azimuth angle by an angle sensor ($\phi$) 33, and this information is forwarded to the control unit (15).

Figure 4:
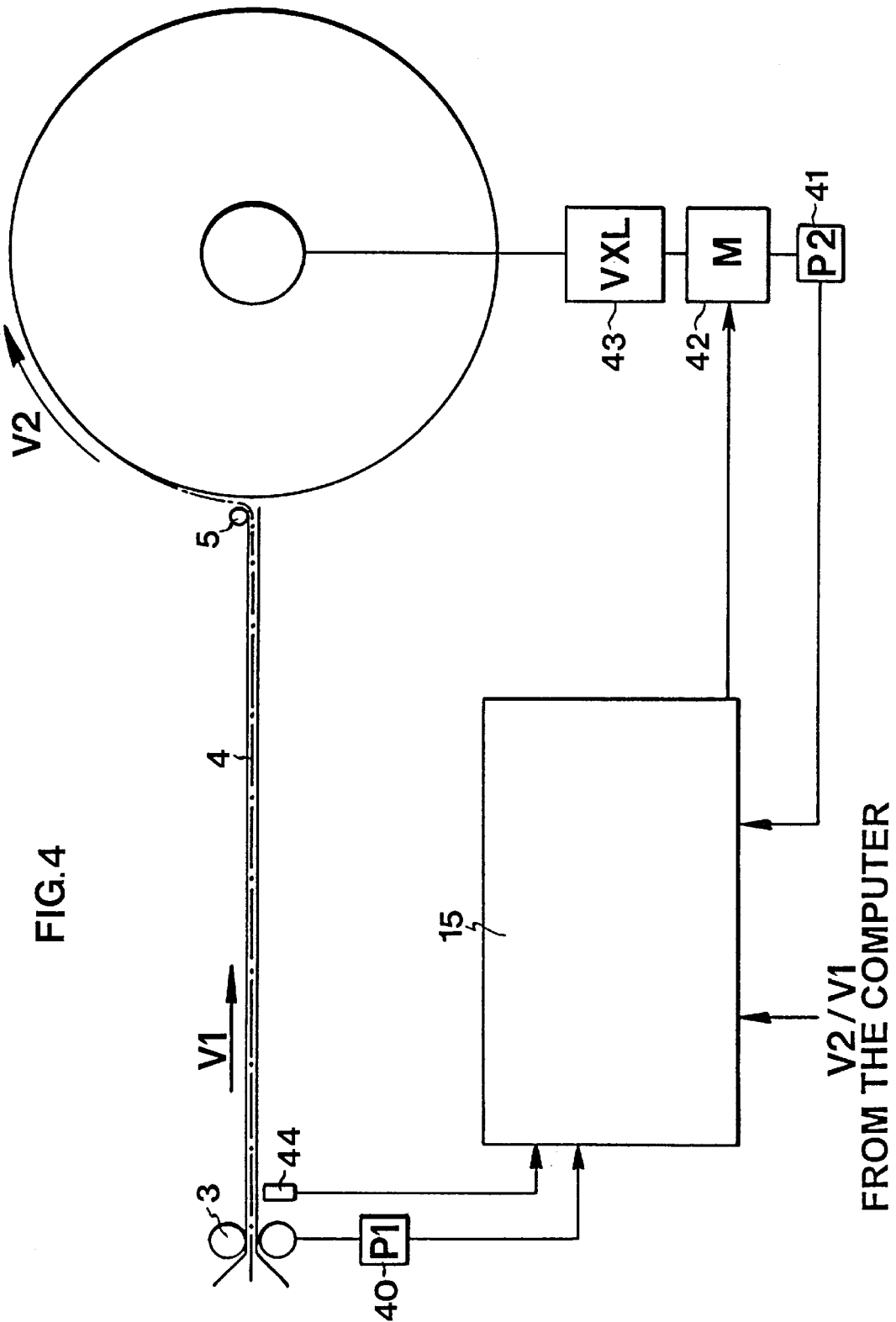
FIG. 4 schematically illustrates the control according to the invention of the relationship between the speed of rotation of the body and the rate of discharge of the strand.

FIG. 4 schematically illustrates another part of the control performed by the control unit 15, namely the control of the speed of rotation of the body 6 and hence of the peripheral speed thereof. A first pulse generator (P1) 40 gives a pulse frequency corresponding to the peripheral speed of the rollers 3 and hence to the rate of discharge V1 of the rubber strand 4. A second pulse generator (P2) 41 gives a pulse frequency corresponding to the peripheral speed V2 of the body 6. The control unit 15 determines V1 and V2, while taking into consideration the diameter of the rollers and of the body as well as the transmission ratio of a gear 43, and then determines the relationship between V2 and V1. This relationship, which is referred to as SSR, should be essentially constant and have a certain value, usually approximately 1.1. The control unit 15 controls a motor 42, which causes the body to rotate in order to maintain the correct SSR value. A photocell 44 provides the control unit 15 with information verifying that the rubber strand is continuous.

In the embodiment illustrated, which of course is but an example of a possible design of the control system according to the invention, and in the application to retreading, which also is but an example, the feedback control primarily consists of the control of the SSR relationship. The azimuth angle is altered according to a predetermined operation schedule with which the personal computer 16 loads the control unit 15. Unlike the SSR value, this schedule is not altered during the coating of the body 6. The feedback control of the SSR value, the feedback consisting of the camera 12 and the computer 14, is sufficient in this application to give excellent results in the form of a tire, whose profile agrees very well with the template, i.e. the aimed-at profile.

As mentioned in the foregoing, a common SSR value is 1.1, i.e. the rubber strand 4 is stretched to a certain extent in order to obtain good adhesion to the body 6. The control of the SSR value is carried out as follows. If, when determining the current measuring point, the computer 14 finds that its value does not fall within the given tolerances, it determines a now SSR value, which it forwards to the control unit 15. If the rubber tread is too thick, the new value will be higher then the old, and vice versa if the rubber tread is too thin. Since the system operates with at least one measuring point per revolution of the body, the control of the thickness of the rubber tread in very exact.

A mode of implementation of the inventive method for coating a body with rubber will now be described in detail.

Assuming that the unit 2 is switched on, such that the rubber mass has the right temperature. The following operations result in a completed tire. Thus, the voltage to the control system in switched on, and the personal computer 16 is also switched on. On the display, the operator is then shown an image containing various process data, of which some may be altered by the operator in order to agree with the type of body to be coated. Then, the body 6 is mounted. Checking of the body is initiated, the personal computer 16 supplies the computer 14 with information, and the body is caused to rotate. On the basis of the information obtained, including the diameter of the body, the computer 14 sets the camera, and then measures the body 6 for control purposes, comparing measurement data deduced from the picture taken by the camera 12 with measurement data corresponding to the type of tire chosen. Should the measurement data of the body at any point fall outside the prescribed tolerances, which are in the order of ±1–2 mm, the computer 14 activates an alarm, causing the operator to scrap the body 6. If the body 6 is found to be acceptable, the operator initiate the coating process. The personal computer 16 supplies data in the form of an operation schedule to the control unit 15. This schedule includes information on SSR and a sequence of azimuth angles. For each azimuth angle of the sequence, the control unit 15 controls the step motor 31, such that the latter rotates the frame 7 to the desires position, which is monitored by the control unit 15 via the angle sensor 33. Furthermore, the control unit continuously determines the SSR value as above and controls, with the aid of the motor 42, the speed of rotation of the body such that the given SSR value is maintained.

At the same time, the computer 14 creates, on the basis of the information received from the personal computer 16, a template for the tire profile in the form of a large number of measuring points end, while the rubber tread is being applied, compares point by point the template with the results obtained from the camera. If there is a deviation falling outside the given tolerances, the computer 14 determines a new SSR value that is to compensate for the deviation and transmits this value to the control system 15. In this manner, the entire body 6 is coated, resulting in a tire whose profile on the whole is identical with the aimed-at profile. The minor differences that occur are without practical significance. Finally, the tire is vulcanized in known manner to a finished end product.

Primarily owing to the exact control, but also owing to the initial checking of the body 6, the finished tire is of high quality, consequently, the scrap percentage is very low, and there should, to all appearances, be but a few complaints from the customers.

The control system according to the invention has a further advantage. Instead of manual inputting of the measurements a certain type of body 6 should exhibit, a carefully prepared, ideal body can be mounted on the frame 7, whereupon the system is ordered to determine the measurements of the body 6 and store these. This is done by having the computer 14 read a picture from the camera 12 and on the basis of this picture determine the measurements of the body 6, whereupon the computer 14 supplies these measurements to the personal computer 16 in order to draw up an operation schedule.

It goes without saying that the embodiments described above are but examples and that modifications thus are conceivable within the scope of the invention as defined in the appended claims. Thus, the control system and the method according to the invention are applicable to the coating of many different sorts of bodies, which may be new as well as reconditioned. The detector, which is a camera in the embodiments described above, may consist of any detector able to record the outline of the body or the tread, the associated equipment for evaluating the information obtained from the detector being, of course, adapted to the type of detector employed. Also, the parameters controlled in the coating process may differ from those indicated above, depending on how the coating is carried out. It is also apparent that control of the SSR of FIG. 4 does not have to be provided along with azimuth control of FIG. 3 and each of the manifestations of control can be separately provided.

We claim:

1. In combination with a coating device adapted to coat a rotating body with a wear layer and having a system for producing a strand of elastomeric material and applying the strand on the body so as to form the wear layer, a control apparatus comprising:

a measurement system;

a template system that establishes template data using said measurement system in preparation for a coating operation of said coating device to coat a body; and a control system that controls said coating operation to coat said body based on said template data and measurements of said body obtained using said measurement system while said body is being coated.

2. Control apparatus according to claim 1, wherein said template system has an operating mode to establish template data using said measurement system to measure an ideal body.

3. Control apparatus according to claim 1, wherein said measurement system employs a non-contact sensor.

4. Control apparatus according to claim 3, wherein said sensor is a camera.

5. In combination with a coating device adapted to coat a rotating body with a wear layer and having a system for producing a strand of elastomeric material and applying the strand on the body so as to form the wear layer, a control apparatus comprising:

a measurement system that employs a camera; and a control system that determines whether a body supplied to said coating device is acceptable for coating based on a measurement of said body obtained by said measurement system;

said control system operating, depending on the determination result, to provide an indication that said body is unacceptable and to control operation of said coating device to coat said body based on measurements of said body obtained by said measurement system while said body is being coated.

6. Control apparatus according to claim 5, further comprising a template system that establishes template data in preparation for the coating operation, and wherein said control system is constructed to control the operation of said coating device to coat said body based additionally on said template data.

7. Control apparatus according to claim 6, wherein said template system includes a user-operated input device to set said template data.

8. Control apparatus according to claim 6, wherein said template system establishes said template data using said measurement system.

9. Control apparatus according to claim 8, wherein said template system has an operating mode to establish said template data based on measurements of an ideal body obtained by said measurement system.

10. A control method for a coating device adapted to coat a rotating body with a wear layer and having a system for producing a strand of elastomeric material and applying the strand on the body so as to form the wear layer, said control method comprising:

using a measurement system to establish template data preparatory to a coating operation of said coating device to coat a body; and controlling said coating operation to coat said body based on said template data and measurements of said body obtained using said measurement system while said body is being coated.

11. A method according to claim 10, wherein said template data is established using said measurement system to measure an ideal body.

12. A method according to claim 10, wherein said measurement system employs a non-contact sensor.

13. A method according to claim 12, wherein said sensor is a camera.

14. A control method for a coating device adapted to coat a rotating body with a wear layer and having a system for producing a strand of elastomeric material and applying the strand on the body so as to form the wear layer, said control method comprising:

measuring a body supplied to the coating device with a measurement system that employs a camera;

determining whether said body is acceptable for coating based on a result of said measuring; and depending on the result of said determining, providing an indication that said body is unacceptable, or controlling operation of said coating device to coat said body based on measurements of said body obtained by said measurement system while said body is being coated.

15. A method according to claim 14, further comprising establishing template data in preparation for the coating operation, and wherein said controlling of said coating device is based additionally on said template data.

16. A method according to claim 15, wherein said template data is manually set.

17. A method according to claim 15, wherein said template data is established using said measurement system.

18. A method according to claim 17, wherein said measurement system is used to measure an ideal body in order to establish said template data.

* * * * *

UNITED STATES PATENT AND TRADEMARK OFFICE
CERTIFICATE OF CORRECTION

PATENT NO. : 5,942,059
DATED      : August 24, 1999
INVENTOR(S) : Jan WULKER and Willie REPPEL It is certified that error appears in the above-identified patent and that said Letters Patent is hereby corrected as shown below:

On the title page item [73], "Decapo Ltd." should read --Dacapo Ltd.--

Signed and Sealed this

Seventh Day of November, 2000

*Attest:*

Q. TODD DICKINSON

*Attesting Officer*        *Director of Patents and Trademarks*